US011352088B2

(12) United States Patent
Lin (10) Patent No.: US 11,352,088 B2
(45) Date of Patent: Jun. 7, 2022

(54) VEHICLE MOBILE DEVICE MOUNTING ASSEMBLY AND AUXILIARY STRUCTURE THEREOF

(71) Applicant: FRUITSHOP INTERNATIONAL CO., LTD., New Taipei (TW)

(72) Inventor: Chin-Sheng Lin, New Taipei (TW)

(73) Assignee: FRUITSHOP INTERNATIONAL CO., LTD., New Taipei (TW)

( * ) Notice: Subject to any disclaimer, the term of this patent is extended or adjusted under 35 U.S.C. 154(b) by 174 days.

(21) Appl. No.: 16/868,500

(22) Filed: May 6, 2020

(65) Prior Publication Data
US 2021/0300496 A1    Sep. 30, 2021

(30) Foreign Application Priority Data

Mar. 31, 2020  (TW) ................................. 109203756

(51) Int. Cl.
*B62J 11/00* (2020.01)
*B60R 11/02* (2006.01)
(Continued)

(52) U.S. Cl.
CPC ........... *B62J 11/00* (2013.01); *B60R 11/0241* (2013.01); *B62J 6/03* (2020.02); *B62J 50/225* (2020.02);
(Continued)

(58) Field of Classification Search
CPC . B62J 45/10; B62J 50/22; B62J 50/225; B62J 43/30
(Continued)

(56) References Cited

U.S. PATENT DOCUMENTS 8,548,536 B1 * 10/2013 Gunnip ................ H04B 1/3888
455/575.1
8,827,234 B2 * 9/2014 Baker ................... G06F 1/1626
248/682
(Continued)

FOREIGN PATENT DOCUMENTS

CN        203840034 U     9/2014
CN        205916245 U     2/2017
(Continued)

OTHER PUBLICATIONS

Evaluation Report of Utility Model Patent dated Dec. 28, 2020 of the corresponding China patent application No. 202020511350.5.

*Primary Examiner* — Scott T McNurlen
(74) *Attorney, Agent, or Firm* — Chun-Ming Shih; HDLS IPR Services (57) ABSTRACT

In a vehicle mobile device mounting assembly and its auxiliary structure, the auxiliary structure is used with a vehicle mounting kit and mounted together on a rod-like portion of a bicycle. The vehicle mounting kit includes a fastening band. The auxiliary structure includes a fastening body, a joining portion integrally formed with the fastening body. The fastening body includes multiple fastening portions on its outer edges and a fastening space in the fastening body. Multiple fastening openings communicating with the fastening space are formed between the fastening portions. The auxiliary structure is mounted on the rod-like portion of the bicycle by inserting the fastening band of the vehicle mounting kit through a joining portion.

7 Claims, 7 Drawing Sheets

(51) Int. Cl.
*B62J 50/21* (2020.01)
*B62J 6/03* (2020.01)
*H04M 1/04* (2006.01)

(52) U.S. Cl.
CPC ... *B60R 11/0217* (2013.01); *B60R 2011/0294* (2013.01); *H04M 1/04* (2013.01)

(58) Field of Classification Search
USPC .................................................. 224/420–421
See application file for complete search history.

(56) References Cited

U.S. PATENT DOCUMENTS

| 10,836,449 B2 * | 11/2020 | Lin ......................... B62J 11/00 |
| 2011/0084081 A1 * | 4/2011 | Chung .................. A45C 13/26 |
| | | 220/628 |
| 2016/0052464 A1 | 2/2016 | Wadey et al. |

FOREIGN PATENT DOCUMENTS

| CN | 206077485 U | 4/2017 | |
| CN | 206100133 U | 4/2017 | |
| CN | 209096889 U | 7/2019 | |
| CN | 209617338 U | 11/2019 | |
| GB | 2479903 A * | 11/2011 | ............... A45C 1/00 |

* cited by examiner

VEHICLE MOBILE DEVICE MOUNTING ASSEMBLY AND AUXILIARY STRUCTURE THEREOF

BACKGROUND

Technical Field

The present invention relates to an accessory for an electronic product and in particular, to a vehicle mobile device mounting assembly and an auxiliary structure thereof, wherein the vehicle mobile device mounting assembly is a vehicle mounting kit and the auxiliary structure.

Related Arts

With the rapid development of the technology industry, today's electronic products such as smartphones and tablet computers can provide people with various information services anytime and anywhere via wireless networks. Especially, applications such as navigation systems are more convenient for outdoor use. Therefore, the above electronic products can be installed on the bicycle frame or its handle bar (handle stem) through accessories, so that users can use a navigation system or other programs on the electrode product during the ride.

However, at present, in order to ensure continuity in electric power supply of the above-mentioned electronic products, there are mounting accessories that can combine, for example, a mobile power supply with the bicycle. However, a mobile power supply or the like is often stacked on the bicycle after stacked on the electronic product. Such a configuration causes usage of the electronic product to be limited to mobile power supplies of specific brands and types. This is because installation has restrictions on orientations or positions, and therefore, the connection of cables is affected, or only specific brands and types of mobile power supply can be installed together.

Moreover, there is often a problem that only the mobile power supply can be installed together, and other device or equipment cannot be used with the electronic product.

In view of the above, in order to improve and solve the above-mentioned shortcomings, the inventor made a lot of research with scientific principles, and finally came up with the present invention with a reasonable design to effectively improve the above-mentioned shortcomings.

SUMMARY

It is an objective of the present invention to provide a vehicle mobile device mounting assembly and an auxiliary structure thereof. It adopts a combination design in which a mounting kit and an auxiliary structure are respectively disposed at two opposite positions of a rod-like portion of a bicycle, which provides activity space for each of them and greatly improves applicability.

Accordingly, the present invention provides an auxiliary structure for a vehicle mobile device mounting assembly, used with a vehicle mounting kit and mounted with the vehicle mounting kit on a rod-like portion of a bicycle, wherein the vehicle mounting kit includes a fastening band that is configured to carry the mobile device, and the auxiliary structure is configured to carry an auxiliary device, the auxiliary structure comprising:

a fastening body, wherein the fastening body includes a plurality of fastening portions disposed on its outer edges, an fastening space defined in the fastening body, and a plurality of fastening openings communicating with the fastening space and having an angle relationship with each other; and the auxiliary structure is inserted into the fastening space through any of the fastening openings; and a joining portion integrally formed with the fastening body;

wherein the auxiliary structure is mounted on the rod-like portion of the bicycle by inserting the fastening band of the vehicle mounting kit through the joining portion.

Accordingly, the present invention provides a vehicle mobile device mounting assembly, mounted on a rod-like portion of a bicycle to carry a mobile device and an auxiliary device, comprising:

a mounting kit for carrying the mobile device, the mounting kit including a support body, a holding base disposed at a back of the support body, and a fastening band extended from the holding base; and an auxiliary structure including a fastening body and a joining portion integrally formed with the fastening body, wherein the fastening body includes a plurality of fastening portions disposed on its outer edges, a fastening space defined in the fastening body, and a plurality of fastening openings communicating with the fastening space and having an angle relationship with each other; and the auxiliary device is inserted into the fastening space through any of the fastening openings;

wherein the fastening band of the mounting kit is inserted through the joining portion to mount the auxiliary structure onto the rod-like portion of the bicycle, and the auxiliary structure and the mounting kit are arranged opposite to each other with respect to the rod-like portion of the bicycle.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Figure 1:
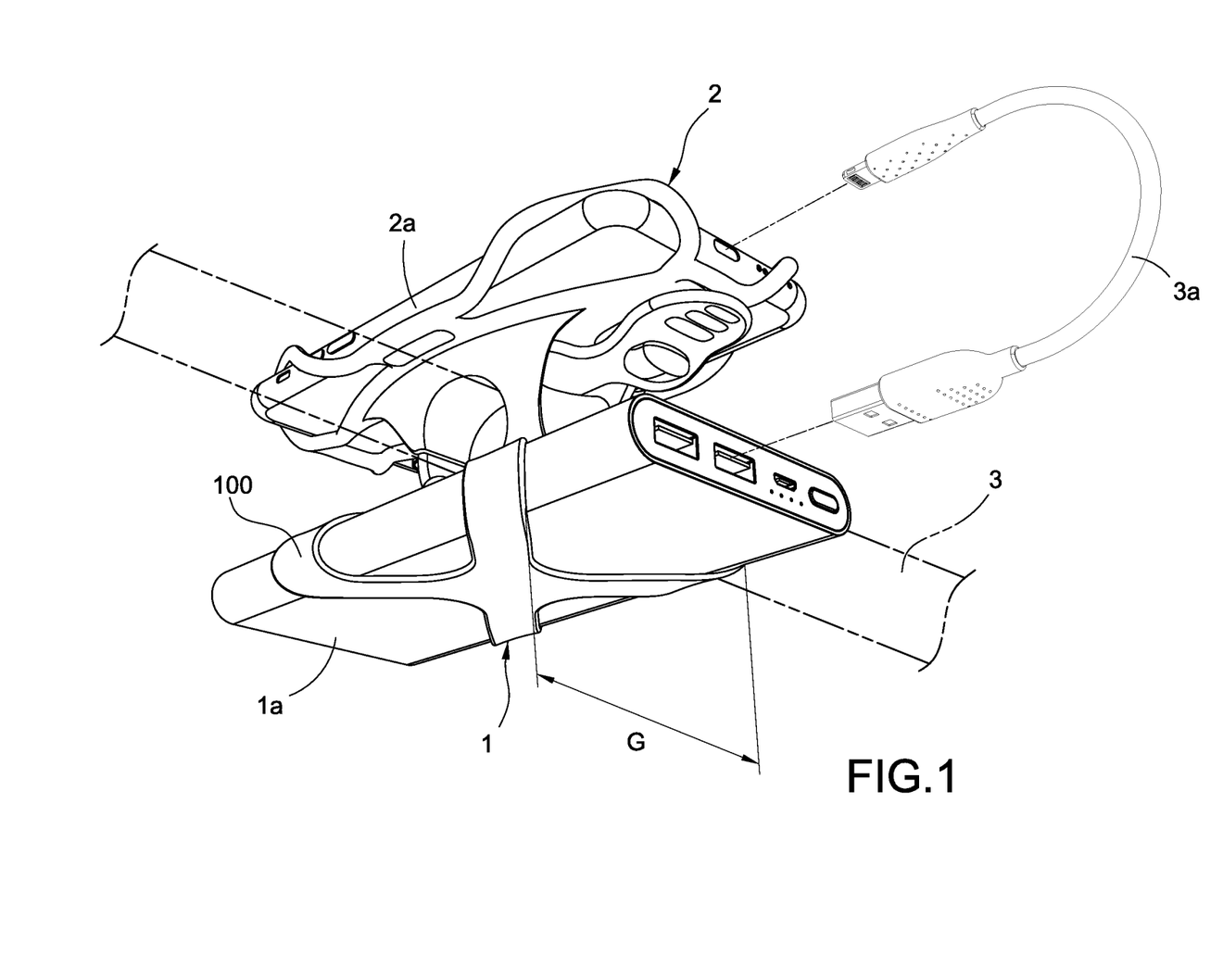
FIG. 1 is a schematic perspective view illustrating the present invention in a use state for placing a mobile power supply.

Please referring to FIG. 1 illustrating the present invention in a use state for placing a mobile device. The present invention provides a vehicle mobile device mounting assembly and an auxiliary structure therefor. The auxiliary structure 1 and a vehicle mounting kit 2 are mounted together on a rod-like portion 3 of a bicycle frame or a bicycle handle stem, so that it is convenient for a rider to use a mobile device 2a (e.g., a mobile phone) for traffic conditions and satellite navigation when riding a bicycle, and use necessary power supply (e.g., a mobile power supply 1a) for the mobile device 2a or other auxiliary device (e.g., a flashlight 1b shown in FIG. 7 or a driving recorder shown in FIG. 8) for other needs during the ride.

Figure 2:
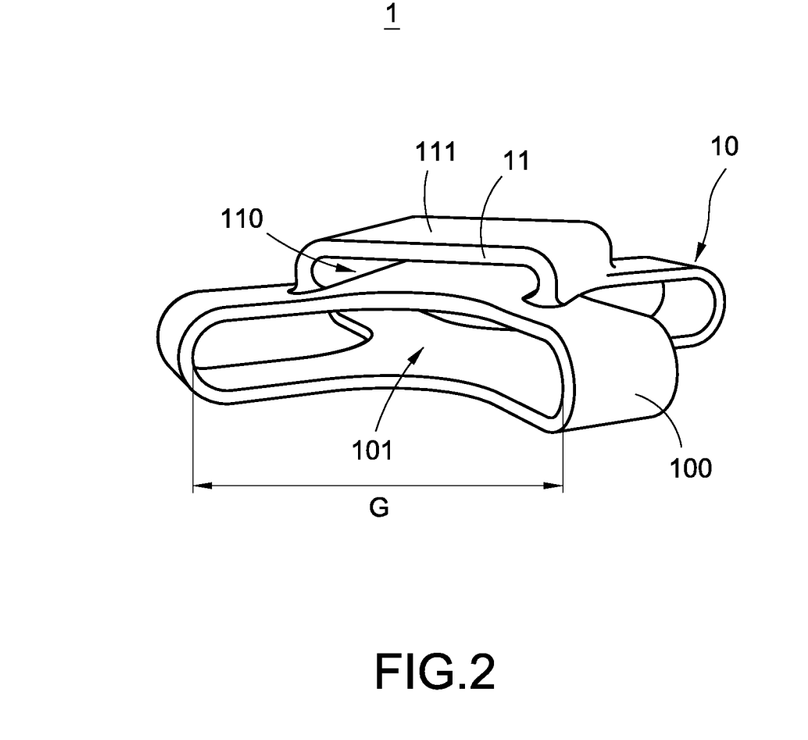
FIG. 2 is a schematic perspective view of the present invention.

As shown in FIGS. 1 and 2, the auxiliary structure 1 is made of a material with elastic recovery properties, such as silicone. The auxiliary structure 1 includes a fastening body 10 and a joining portion 11 integrally formed with the fastening body 10. The fastening body 10 includes a plurality of fastening portions 100 disposed at its outer edges, a fastening space 101 defined in the fastening body 10, and a plurality of fastening openings G communicating with the fastening space 101 and having an angle relationship with each other. The joining portion 11 is integrally formed on the fastening body 10, and an insertion hole 110 is formed between the fastening body 10 and the joining portion 11. The joining portion 11 further has a contact surface 111.

Figure 3:
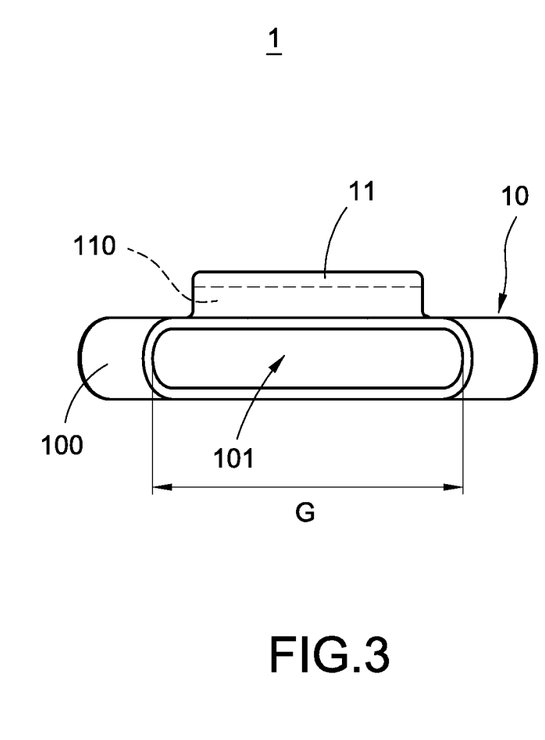
FIG. 3 is a schematic side view of the present invention.
Figure 4:
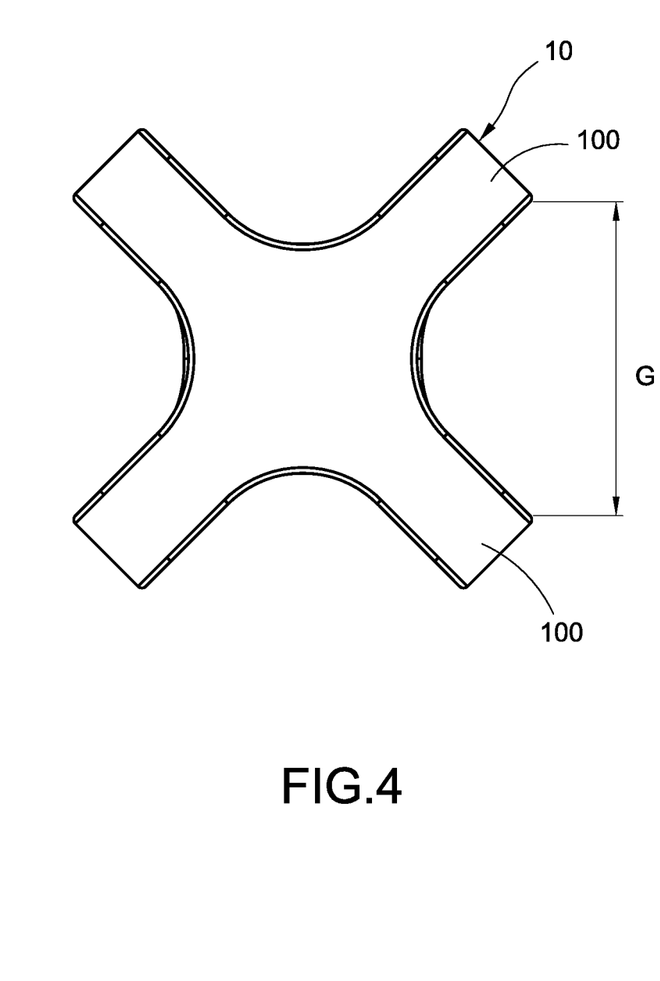
FIG. 4 is a schematic top view of the present invention.

Please refer to FIGS. 3 and 4. Each of the fastening openings G is formed between any two adjacent fastening portions 100, and each of the fastening openings G is recessed into the fastening body 10, so that each of the fastening portions 100 forms an elongated shape extended outward from a center of the fastening body 10. The number of the fastening portions 100 can be four, thus forming a cross shape or an X shape, so that each fastening opening G has a corresponding direction based on the angle relationship between any two adjacent fastening openings G. This way, as shown in FIG. 1, after each fastening portion 100 is stretched, the mobile power supply 1a is inserted into the fastening space 101 from any fastening opening G, and then the mobile power supply 1a is fastened by each fastening portion 100. Besides, according to the orientation of the mobile power supply 1a and the corresponding fastening opening G, the mobile power supply 1a can protrude from the fastening opening G in a lengthwise direction to achieve fastening effects.

Figure 5:
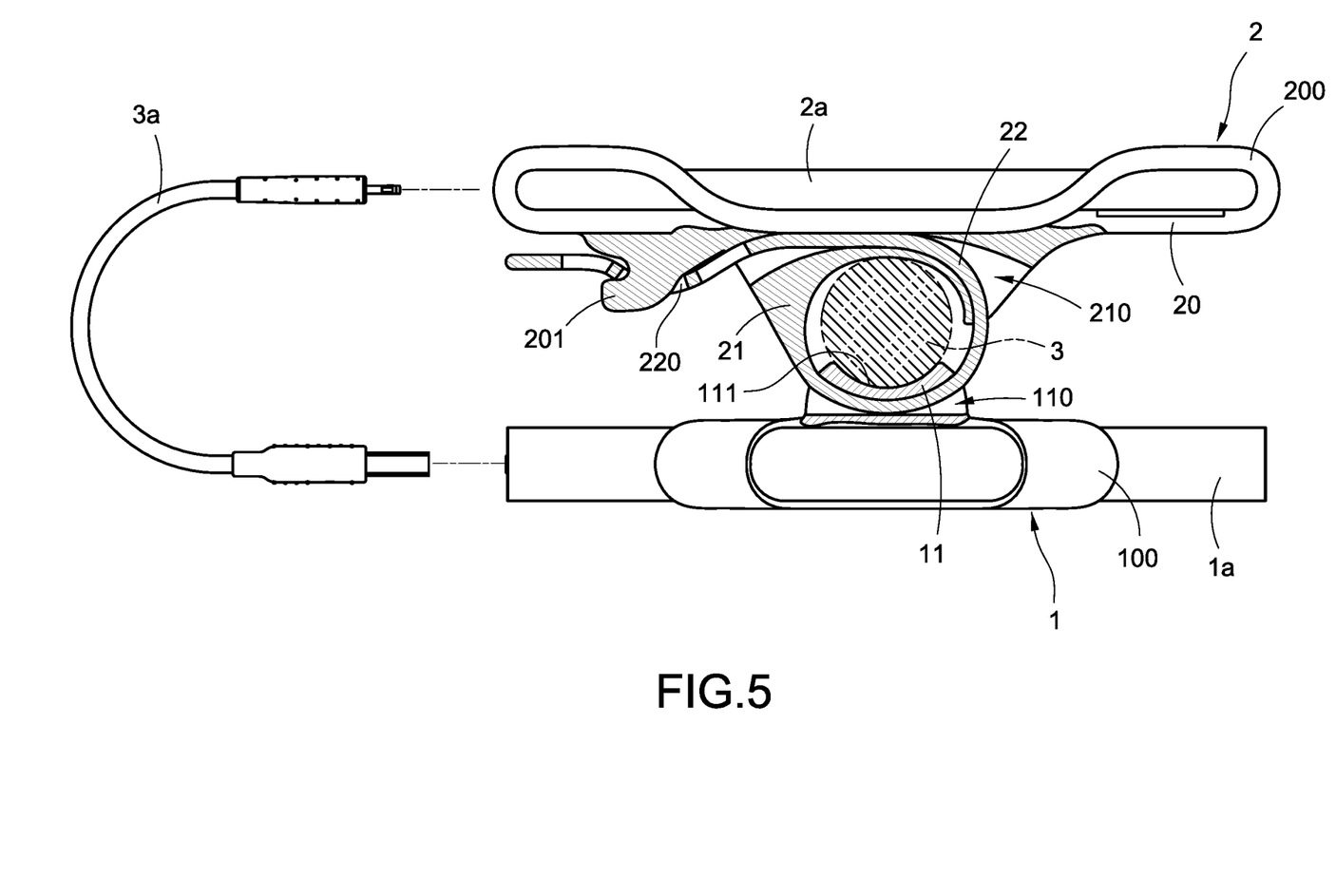
FIG. 5 is a cross-sectional view illustrating the present invention in the use state for placing the mobile power supply.

Please also refer to FIG. 1. The vehicle mounting kit 2 can be a commercial product for fixing the mobile device 2a to the rod-like portion 3 of the bicycle, and then the auxiliary structure 1 can be fastened with the vehicle mounting kit 2, so that the mobile device 2a has the mobile power supply 1a as required or other tools needed for the ride. As shown in FIG. 5, the vehicle mounting kit 2 is generally made of a material with elastic recovery properties, such as silicone. The vehicle mounting kit 2 includes a support body 20, a holding base 21 disposed at a back of the support body 20, and a fastening band 22 extended from the holding base 21. A front surface of the support body 20 is for the mobile device 2a to be laid on it, and the mobile device 2a is constrained on the support body 20 by the limiting portion 200 which is disposed on the support body 20. The holding base 21 is used to contact against the rod-like portion 3, and then the fastening band 22 winds around the rod-like portion 3 and is inserted through a through hole 210 in the holding base 21. Thereby, a plurality of buckling holes 220 arranged in an end portion of the fastening band 22 can be engaged with a buckling base 201 disposed on the support body 20, so that the mobile device 2a can be fixed to the rod-like portion 3 of the bicycle.

As mentioned above, in the auxiliary structure 1 of the present invention, when the fastening band 22 of the vehicle mounting kit 2 is wound around the rod-like portion 3 of the bicycle, the fastening band 22 is also inserted through the insertion hole 110 of the auxiliary structure 1, so that the auxiliary structure 1 and the vehicle mounting kit 2 are respectively arranged at two opposite positions of the rod-like portion 3, which means that the rod-like portion 3 is arranged between the auxiliary structure 1 and the vehicle mounting kit 2. Moreover, after the auxiliary structure 1 and the vehicle mounting kit 2 are assembled onto the bicycle, they still have their own independent rooms for movement without being restricted by each other, thereby allowing assembling in a more flexible manner such that the mobile device 2a and the mobile power supply 1a can be electrically connected through a connection line 3a. Furthermore, as shown in FIG. 5, a contact surface 111 of the auxiliary structure 1 is bent upon contact against another side of the rod-like portion 3, so that the insertion hole 110 deforms and enlarges its opening for insertion of the fastening band 22.

Figure 6:
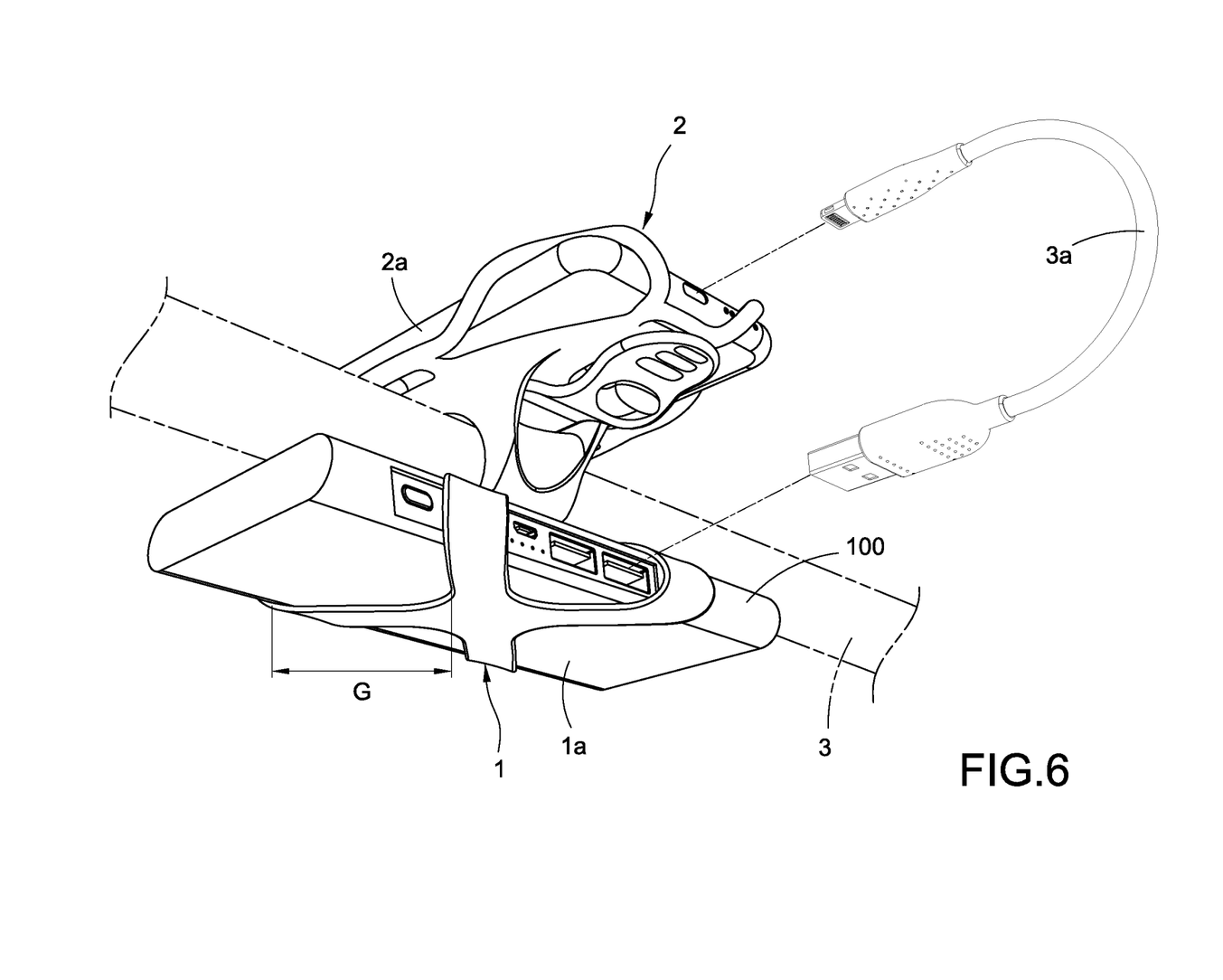
FIG. 6 is another schematic perspective view illustrating the present invention in the use state for placing the mobile power supply.

Accordingly, as shown in FIG. 1, if a plug hole of the mobile power supply 1a and a plug hole of the mobile device 2a are matched in their designs, they can be connected through the connection line 3a. However, if the mobile power supply 1a and the mobile device 2a are not matched in designs like they are in FIG. 1, then please refer to FIG. 6. As shown in FIG. 6, the mobile power supply 1a can be placed in the auxiliary structure 1 through the fastening openings G of different directions, so the plug hole of the mobile power supply 1a can be adjusted to a direction matching a direction of the plug hole of the mobile device 2a before the mobile power supply 1a is fastened tightly. This way, the connection line 3a is not restricted in plug-in connection, and can be set up according to different types of mobile power supply 1a, thus increasing the utility of the vehicle mounting kit 2.

Figure 7:
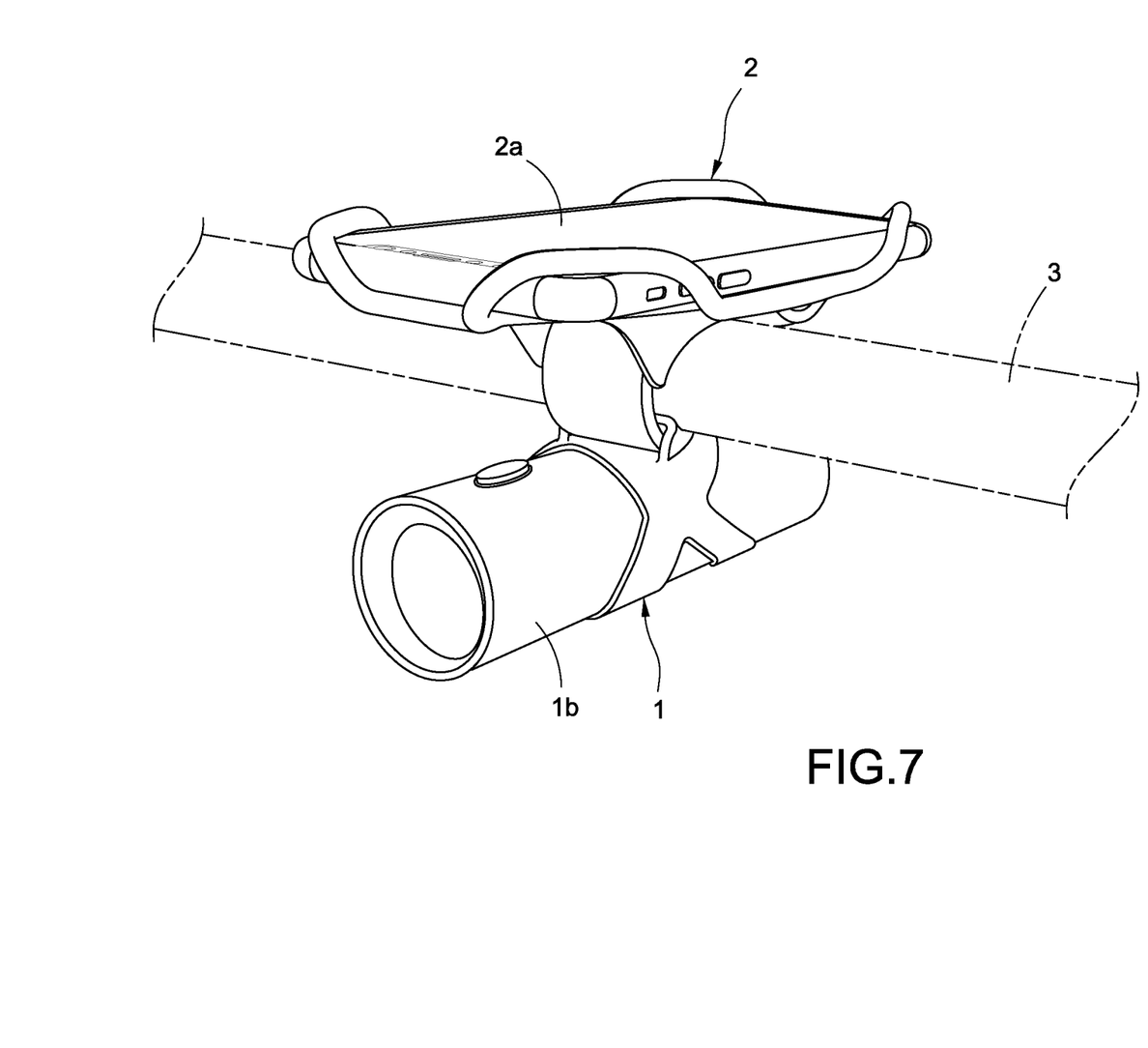
FIG. 7 is a schematic perspective view illustrating the present invention in a use state for placing a flashlight.
Figure 8:
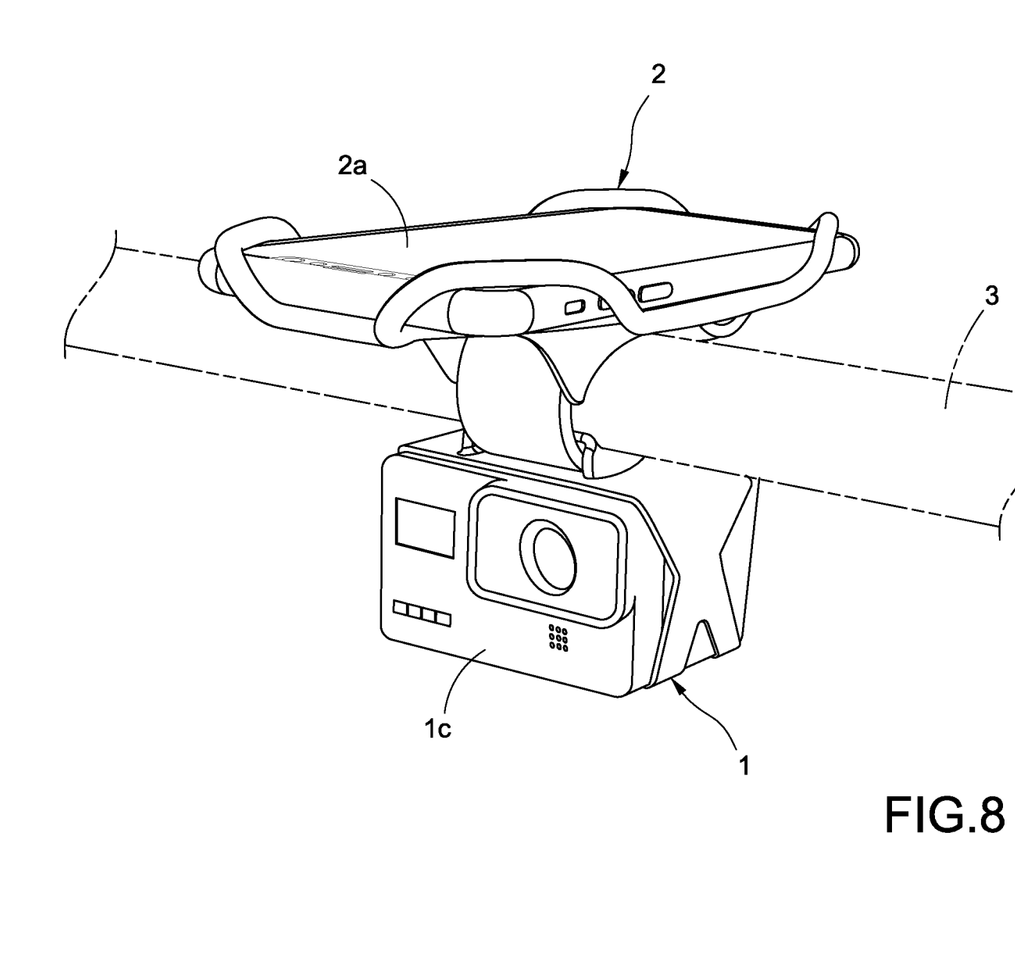
FIG. 8 is a schematic perspective view illustrating the present invention in a use state for placing a driving recorder.

Furthermore, the auxiliary device is not limited to only fasten the mobile power supply 1a. As shown in FIG. 7, it can also be used to fasten a flashlight 1b, or a driving recorder 1c as shown in FIG. 8. But regardless of the tools or equipment to be fastened, due to the auxiliary device and the vehicle mounting kit 2 are respectively fastened at two opposite positions of the bicycle rod-like portion 3 of the bicycle. Therefore, they have more flexible space for usage without interference from each other, and the auxiliary structure 1 can achieve multi-directional fastening for items (e.g. the mobile power supply 1a, the flashlight 1b, or the driving recorder 1c) in need of fastening. The auxiliary structure 1 can work for more arbitrary combinations, which improves utility of the vehicle mounting kit 2, and further enhances use values of product.

Therefore, by the above-mentioned structure, the vehicle mobile device mounting assembly and an auxiliary structure thereof can be constituted.

In summary, the present invention can indeed achieve the anticipated effects and purposes, and solve the problems of conventional techniques. The present invention has novelty and inventiveness, and completely meets the requirements for patentability. Therefore, a request to patent the present invention is filed according to patent laws. Examination is kindly requested, and allowance of the present invention is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A vehicle mobile device mounting assembly, mounted on a rod-like portion of a bicycle to carry a mobile device and an auxiliary device, comprising:
   a mounting kit for carrying the mobile device, the mounting kit including a support body, a holding base disposed at a back of the support body, and a fastening band extended from the holding base; and
   an auxiliary structure including a fastening body and a joining portion integrally formed with the fastening body, wherein the fastening body includes a plurality of fastening portions disposed on its outer edges, a fastening space defined in the fastening body, and a plurality of fastening openings communicating with the fastening space and having an angle relationship with each other; and the auxiliary device is inserted into the fastening space through any of the fastening openings;
   wherein the fastening band of the mounting kit is inserted through the joining portion to mount the auxiliary structure onto the rod-like portion of the bicycle, and the auxiliary structure and the mounting kit are arranged opposite to each other with respect to the rod-like portion of the bicycle.

2. The vehicle mobile device mounting assembly according to claim 1, wherein the mounting kit and the auxiliary structure are made of silicone.

3. The vehicle mobile device mounting assembly according to claim 1, wherein the fastening body includes four fastening portions arranged in a cross shape or a X shape.

4. The vehicle mobile device mounting assembly according to claim 3, wherein each of the fastening openings is formed between any two adjacent fastening portions, and each of the fastening openings is recessed into the fastening body, so that each of the fastening portions forms an elongated shape and extends outward from a center of the fastening body.

5. The vehicle mobile device mounting assembly according to claim 1, wherein each of the fastening openings is formed between any two adjacent fastening portions, and each of the fastening openings is further recessed into the fastening body, so that each of the fastening portions is formed into a long shape and extends outward from a center of the fastening body.

6. The vehicle mobile device mounting assembly according to claim 1, wherein an insertion hole is formed between the joining portion and the fastening body, and the insertion hole is provided for insertion of the fastening band.

7. The vehicle mobile device mounting assembly according to claim 1, wherein the joining portion is provided with a contact surface for contact against the rod-like portion.

* * * * *